US007733918B2

(12) United States Patent  
Poimboeuf et al.

(10) Patent No.: US 7,733,918 B2
(45) Date of Patent: Jun. 8, 2010

(54) SYSTEM FOR LIVE AUDIO PRESENTATIONS

(75) Inventors: Michael Poimboeuf, San Mateo, CA (US); Scott C. Bittle, Palo Alto, CA (US); David D. Clementson, Palo Alto, CA (US); John C. Weitz, Belmont, CA (US); Robert Jiro Snavely, San Francisco, CA (US); J. Douglas Rollow, IV, San Francisco, CA (US); Peter Andreas Richert, San Jose, CA (US); Dave Conry, El Granada, CA (US); Chris Michael, Tewksbury, MA (US); Georges Berenger, San Francisco, CA (US)

(73) Assignee: AVID Technology, Inc., Tewksbury, MA (US)

( * ) Notice: Subject to any disclaimer, the term of this patent is extended or adjusted under 35 U.S.C. 154(b) by 1141 days.

(21) Appl. No.: 11/223,534

(22) Filed: Sep. 9, 2005

(65) Prior Publication Data

US 2008/0177552 A1 Jul. 24, 2008

Related U.S. Application Data

(60) Provisional application No. 60/609,084, filed on Sep. 10, 2004.

(51) Int. Cl.
*H04J 3/06* (2006.01)
(52) U.S. Cl. ................. 370/509; 370/242; 370/250; 370/228
(58) Field of Classification Search ................. None
See application file for complete search history.

(56) References Cited

U.S. PATENT DOCUMENTS

| 5,792,971 | A * | 8/1998 | Timis et al. ............. 84/609 |
|---|---|---|---|
| 6,353,169 | B1 | 3/2002 | Juszkiewicz et al. |
| 6,507,658 | B1 | 1/2003 | Abel et al. |
| 2003/0050989 | A1 * | 3/2003 | Marinescu et al. ......... 709/208 |
| 2003/0055518 | A1 | 3/2003 | Aiso et al. |
| 2003/0172797 | A1 * | 9/2003 | Juszkiewicz et al. ........ 84/601 |
| 2004/0032883 | A1 * | 2/2004 | Knapp et al. ............. 370/509 |

FOREIGN PATENT DOCUMENTS

WO  WO 03/087980  10/2003

OTHER PUBLICATIONS

Lidbetter, P.S. et al., "A Fibre Optic Multi-Channel Communication Link Developed for Remote Interconnection in a Digital Audio Console", Audio Engineering Society Reprint 1986, Audio Engineering Society, NY, NY, XP000796837, Mar. 1986, pp. 2-30.

* cited by examiner

*Primary Examiner*—Duc C Ho
(74) *Attorney, Agent, or Firm*—Oliver Strimpel

(57) ABSTRACT

In a live audio presentation system, a stage rack and a front of house rack are interconnected by a transmission medium that transmits digital audio data and control information between them. Packets of digital audio data and control information are sent at the audio sampling rate. The packets of data are encoded using an encoding technique that provides unique codes that may be detected, thus enabling clock recovery of a clock signal embedded in the data packets. Data packets may include data for error checking. A serial digital transmission medium may be used as the transmission medium. Such a transmission medium uses low voltage signals and supports high bit rates. The system is synchronized by the FOH rack which transmits data to the stage rack according to a local audio sample clock or an external audio sample clock to which it synchronizes. This clock is embedded in data packets sent to the stage rack. The stack rack recovers the audio sample clock from data received from the FOH rack and synchronizes its receive and transmit operations to this recovered clock. The FOH rack recovers the audio sample clock from data received from the stage rack and synchronizes its receive operations to this recovered clock. The FOH rack may include an embedded computer that processes the digital audio data, and may include DSP processing that handles so-called plug-in software. A digital audio workstation or sequencer also may be connected to the FOH rack to either record the live presentation or to inject edited, recorded audio into the live presentation.

28 Claims, 2 Drawing Sheets

SYSTEM FOR LIVE AUDIO PRESENTATIONS

CROSS REFERENCE TO RELATED APPLICATION

This application is a nonprovisional application that claims the benefit under 35 U.S.C. 119 of prior provisional patent application Ser. No. 60/609,084, filed Sep. 10, 2004.

BACKGROUND

In live audio presentations, equipment such as microphones, speakers, amplifiers, instruments and other audio devices have inputs and outputs that are connected, whether through wired or wireless connections, to a central location called a stage rack. The stage rack commonly includes significant audio processing. A console (often referred to as the front of house) is connected to the stage rack to provide controls for mixing, level controls and other operations. The audio processing is generally limited to the capabilities of the stage rack and/or the front of house console.

The connection between the stage rack and the front of house console typically is a cable carrying analog signals. The reliability of the cabling is important so that the live audio presentation is not adversely affected. Most data loss in such environments is due to catastrophic failures, typically of the cabling or connectors for the cabling. Data loss between the stage rack and front of house due to noise or interference occurs less frequently in a properly installed system.

Digital interconnects between the stage rack and the front of house console have improved audio performance over analog interconnects, with reduced noise and distortion. However, current digital interconnects have their own drawbacks. For example, a (MADI) interconnect requires separate synchronization and control streams. Ethernet and other network based connections tend to have high latency and some protocols do not guarantee data delivery. Digital interconnects are still subject to data loss due to catastrophic failures of the cabling or connectors.

SUMMARY

In a live audio presentation system, a stage rack and a front of house rack are interconnected by a transmission medium that transmits digital audio data and control information between them. Packets of digital audio data and control information are sent at the audio sampling rate. The packets of data are encoded using an encoding technique that provides unique codes that may be detected, thus enabling clock recovery of a clock signal embedded in the data stream. The encoding technique also adds bits of data to the data stream, which improves the reliability of transmission of the data stream. Data packets may include data for error checking, and error checking and correction, such as a cyclical redundancy check field, and Reed-Solomon, Turbo Code, or other error correcting codes. A serial digital transmission medium, such as commonly used for serial video data transmission, may be used as the transmission medium. Such a transmission medium uses low voltage signals and supports high bit rates.

The system is synchronized by the FOH rack which transmits data to the stage rack according to a local audio sample clock or an external audio sample clock to which it synchronizes. This clock is embedded in the data stream sent to the stage rack. The stage rack recovers the audio sample clock from data received from the FOH rack and synchronizes its receive and transmit operations to this recovered clock. The FOH rack recovers the audio sample clock from data received from the stage rack and synchronizes its receive operations to this recovered clock. Redundant transmission media can be used to connect the stage rack and the FOH rack. If one of the transmission media fails, the receiver can instantly, automatically and transparently transition to processing signals received from the other transmission medium.

The synchronization to the external source may be enabled in a manner such that the external source is locked to only if that signal is within a specified target range of a sampling rate. If this signal is out of target range, locking to this signal is not enabled. If locking is enabled to this signal and this signal drops, or rises, out of target range, but within a wider tracking range, locking to this external clock is maintained. If locking is enabled to this signal and this signal drops, or rises, out of tracking range, locking to this external clock is disabled. Allowing the signal to track outside the range ensures greater reliability during a performance during which a reference clock may drift.

The FOH rack may route digital audio data and control information to a console for processing by the console. The FOH rack also, or alternatively, may include an embedded computer that processes the digital audio data using control signals from the console or from a user interface on the FOH rack. The processing performed at the FOH rack or console may include DSP processing, such as may be found in digital audio workstations or sequencers. The embedded computer also may send control signals to the console to indicate various status information, e.g., meters and fader positions.

A failure of the embedded computer needs to be isolated from the processing performed by the DSPs so as to permit live audio processing to continue even if the embedded computer of the FOH rack fails and is restarted. Separate reset domains are provided in the hardware for the DSPs, control surface and embedded computer. Also, a direct connection between the DSPs and the control surface is provided, for example over a controller area network (CAN) bus. The embedded computer also connects to the DSPs, for example over a PCI bus. When the embedded computer is operational, control information passes between the control surface and the DSPs over the CAN bus. The DSPs provided information to the computer which parses the information and provides control changes to the DSPs. The computer also determines what control information should be sent to the control surface. If the computer fails, the DSP take over the responsibility of interpreting data received from the control surface and for determining which control information to send to the control surface. A restart of the embedded computer does not terminate processing by the DSPs and permits the control surface to exchange data directly with the DSPs while the embedded computer is restarting.

The DSPs also may execute audio processing functions that are defined by so-called plug-in software. The use of such plug-ins provides the operator with the ability to add software-based audio processing features, executed on the DSP, thus providing flexibility to expand the capabilities of the FOH rack. However, such plug-ins also include graphical user interface processes that are executed on the embedded computer in the FOH rack or console. A failure of the plug-in's process on an embedded computer could result in a failure on the embedded computer. To reduce the possibility of such failures, plug-ins are executed in a separate process from the main application running on the embedded computer that handles communication of audio and control information among the main application, the DSPs and the console. In this manner, its failure does not terminate operation of other processes on the computer. However, the failure of this process on the computer will not terminate processing by the DSPs. The main audio workstation application may be provided with "patch bay" software to permit the operator to bypass the operations performed by the failed plug-in on the DSPs.

A digital audio workstation or sequencer also may be connected to the FOH rack to either record the live presentation or to inject edited, recorded audio into the live presentation.

DETAILED DESCRIPTION

Figure 1:
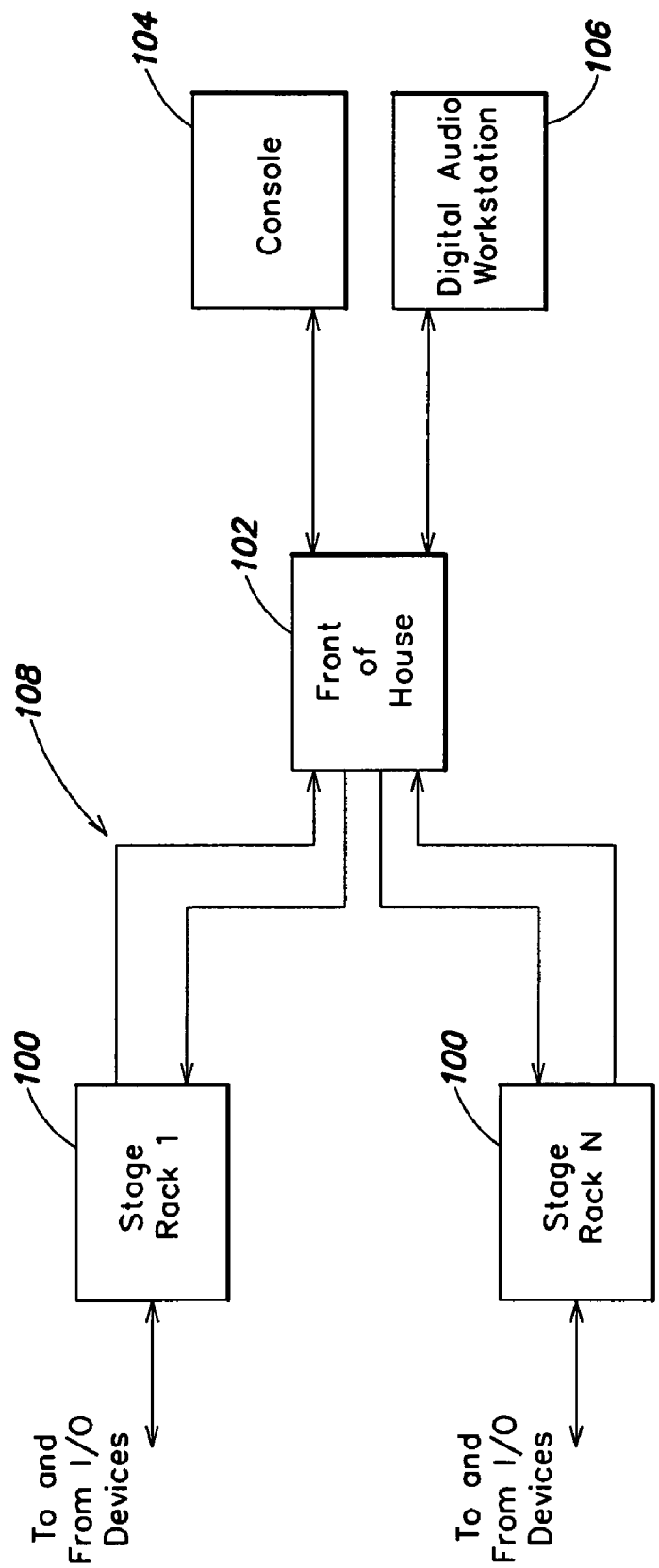
FIG. 1 is diagram of an example live audio presentation system.

Referring to FIG. 1, an overview of an example live audio presentation system will now be provided. One or more stage racks 100 are provided to connect to various inputs and outputs, such as microphones, speakers, amplifiers, instruments and other audio devices (not shown) that may be used on a stage in a live presentation. The stage rack(s) 100 connect to a front of house (FOH) rack 102, typically located at the front of an auditorium or the like, and thus at a distance from the stage. An operator uses a console 104 connected to the FOH rack 102 to control processing performed on digital audio data. An FOH rack may merely route digital audio data and control information to the console for processing by the console. The FOH rack also, or alternatively, may include an embedded computer, such as a general purpose computer configured with an embedded operating system, such as WINDOWS XP EMBEDDED, that runs an audio processing application that processes the digital audio data using control signals from the console. A control surface also may be one of the inputs to the stage rack and may connect to the stage rack through a controller area network (CAN). Signals from this control surface also could be used to control the audio processing performed at the FOH rack or console. The embedded computer also may send control signals to the console to indicate various status information, e.g., meters and fader positions.

The processing performed at the FOH rack may include DSP processing that handles so-called plug-in software as described in U.S. Pat. No. 5,842,014, hereby incorporated by reference. Such a system distributes processing tasks among one or more general purpose DSPs or other suitable processors. The distribution of tasks is performed by an intermediate level software object or "plug-in." The plug-in is designed to allocate resources of all or part of one or more DSP chips for a specific, limited set of signal processing algorithms associated with the plug-in. The DSP code running on the DSP chips is dedicated to the plug-in and is written to efficiently implement the set of algorithms associated with the plug-in. As a user of the plug-in requests a specific algorithm that is one of those algorithms among its set, the object allocates DSP resources to implement that algorithm in the most efficient way it is able. The flexibility of performing such processing is enhanced by connecting the processors in a time division multiplexed (TDM) bus structure.

A failure of the embedded computer needs to be isolated from the processing performed by the DSPs so as to permit live audio processing to continue even if the embedded computer of the FOH rack fails and is restarted. Separate reset domains are provided in the hardware for the DSPs, control surface and embedded computer. Also, a direct connection between the DSPs and the control surface is provided, for example over a controller area network (CAN) bus. Any control information from a controller connected to the stage rack also can be sent by the FOH rack to the DSPs over the CAN bus. The embedded computer also connects to the DSPs, for example over a PCI bus. When the embedded computer is operational, control information passes between the control surface and the DSPs over the CAN bus. The DSPs provided information to the computer which parses the information and provides control changes to the DSPs. The computer also determines what control information should be sent to the control surface. If the computer fails, the DSP take over the responsibility of interpreting data received from the control surface and for determining which control information to send to the control surface. A restart of the embedded computer does not terminate processing by the DSPs and permits the control surface to exchange data directly with the DSPs while the embedded computer is restarting.

Because the plug-ins also include graphical user interfaces that are executed on the embedded computer in the FOH rack or console, a failure of the plug-in process on the embedded computer could result in a failure on the embedded computer. To reduce the possibility of such a failure, plug-ins are executed in a separate process from the main application running on the embedded computer that handles communication of audio and control information among the main application, the DSPs and the console. In this manner, its failure does not terminate operation of other processes on the computer. However, the failure of this process on the computer will not terminate processing by the DSPs. The main audio workstation application may be provided with "patch bay" software to permit the operator to bypass the operations performed by the failed plug-in on the DSPs or to mute the operations of the failed plug-in.

If the plug-in process fails, it also is possible to rebuild the plug-in process, while audio continues to be processed. First, if all of the DSPs are bypassed and muted, the DSPs hosting the plug-ins is reset. A new process hosting the plug-ins is created, and then the plug-ins are reinstantiated in both the embedded computer and on the DSP. After the process and DSPs are restarted with the plug-ins, the user may re-inserted them into the live audio processing. In other words, the grouping of the plug-ins in a process on the embedded computer, and on a reserved set of DSPs on the DSPs, allows for protection of the DSPs, should the embedded computer's process hosting plug-ins fail. The audio mixing engine is capable of isolating the DSP processing of the plug-ins, so that even after the process hosting the plug-ins has failed, each plug-in can be bypassed or muted. After bypassing or muting all the (DSP) Plug-Ins, a new process hosting plug-ins can be recreated without affecting the audio mixing of the system. The plug-ins can be recreated in that process and on the DSP(s) reserved for plug-ins. Then at the user's discretion, the DSP Plug-In effects can be re-inserted in the audio processing, as they were before the initial problem occurred.

Additional reliability is provided by dividing the main audio application into other separate processes. In particular, a separate process for handling communication with the control surface is executed as a separate process. A separate data model process handles monitoring the internal state of the console and communication with the DSPs. Yet another separate process executes the graphical user interface for the main audio application through the operating system resources. Finally a separate shell process monitors the status of the other process and attempts to relaunch them if they fail or crash.

A digital audio workstation or sequencer 106 also may be connected to the FOH rack 102 to either record the live presentation or to inject edited, recorded audio into the live presentation.

The connection between the stage rack 100 and the FOH rack 102 is illustrated at 108 and comprises a transmission medium, e.g., a coaxial cable, twisted pair, fiber optic link, etc., for each direction of communication. That is, there is a transmission medium for sending digital data, including digital audio data and control information, from the stage rack to the FOH rack, and another transmission medium for sending such digital data from the FOH rack to the stage rack. The transmission medium in each direction of communication also may be redundant, with transitioning from one medium to its backup medium when a failure is detected. The transition can be made without perceptible data loss. Thus, in the event of a catastrophic failure of one transmission medium, the backup medium may be used.

Figure 2:
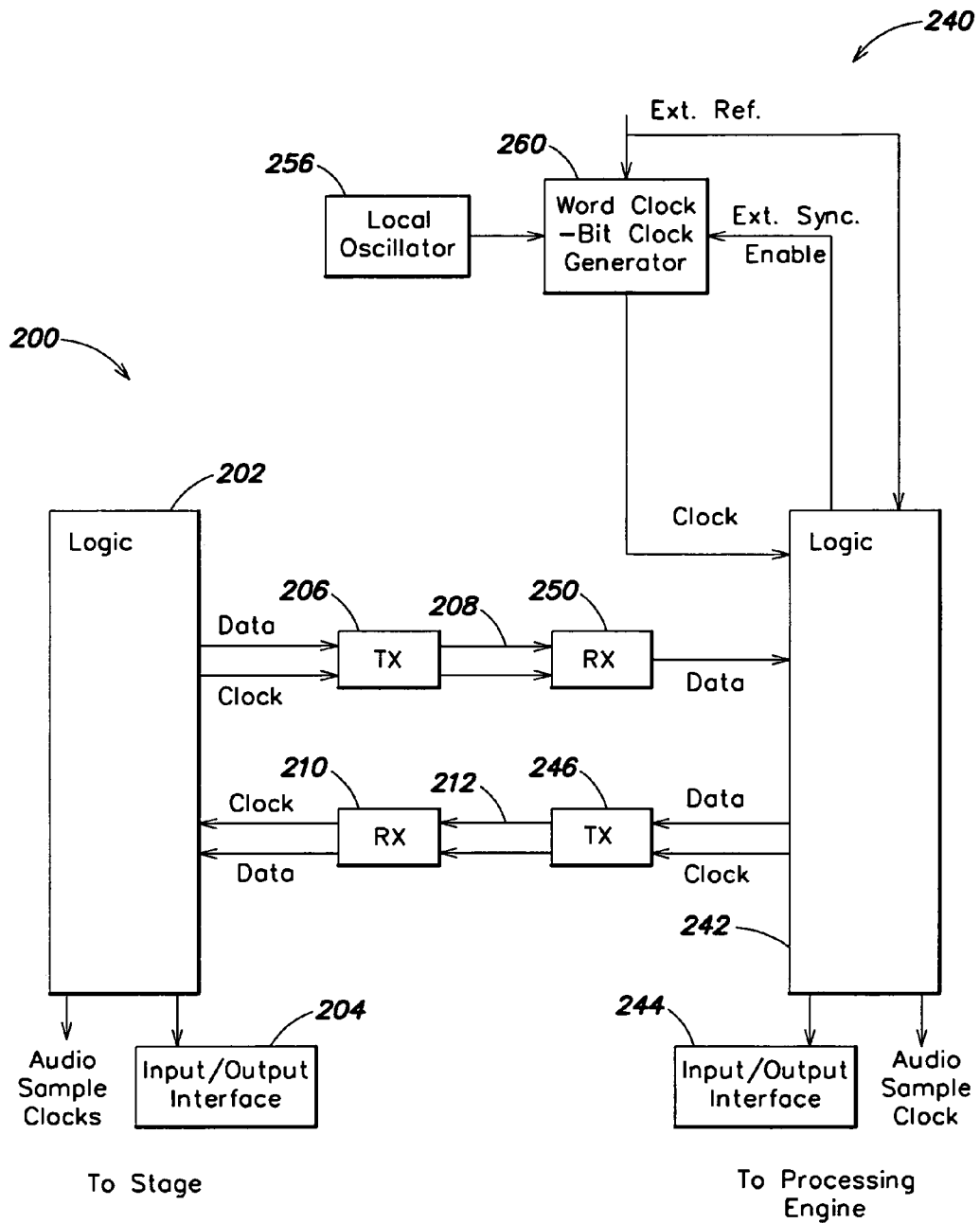
FIG. 2 is a block diagram of an example implementation of an interface between a stage rack and a front of house (FOH) rack.

Referring now to FIG. 2, a block diagram of an example implementation of the interconnection between the stage rack and the FOH rack will now be described.

The transmission media 208 and 212 may be implemented according to the specifications for transmission media for standard serial digital interfaces for video signals, particularly SMPTE-292M (used for high definition video) and SMPTE-259M (used for standard definition video). Such transmission media are useful for transmitting digital data including digital audio data and control information because they use low voltage (one volt peak-to-peak) signals and support high data rates. Other transmission media also may be used, such as fiber optic cable.

The data sent over the transmission medium may be encoded using 8B10B encoding. Such encoding facilitates galvanic isolation (by using transformers and/or capacitors) because it uses a DC-free signal pattern. Such encoding also uses and a set of special codes that are unique, i.e., no random combination of other codes can generate a pattern that includes one of the special codes. By having such special codes, one of the special codes, e.g., the K28.5 code in 8B10B encoding, may be used as a top of frame indicator, from which a clock signal can be recovered. Other encoding techniques with similar characteristics also may be used, such as 4B5B, 16B20B, or biphase mark encoding. Error Detecting and Correcting Codes such as Cyclic Redundancy Check (CRC), Reed-Solomon, Turbo-Code, or other codes may be used for error detection and error correction.

On the stage rack side 200, logic 202 provides audio sample clocks. The audio sample clock may be, for example, 48 kHz, in which case the word clock may be 12.288 MHz and the bit clock may be 122.88 MHz, assuming 256 words of data to be transmitted per audio sample clock period, and 10 bits per word. Logic 202 also connects to an input/output interface 204 through which input audio data and control information and output audio data and control information may be communicated to other devices in or connected to the stage rack. Such an interface may provide data to and receive data from an interface such as described in U.S. patent application Ser. No. 10/342,963, filed Jan. 15, 2003 and entitled "Audio and Music Data Transmission Medium and Transmission Protocol."

The logic 202 includes registers for storing control information and buffers for storing input audio data and output audio data. Data in the buffers and the control information are packaged into data packets that are encoded and transmitted to the FOH rack. How the control information and buffers are arranged and processed into packets depends on the implementation. The data packets include a cyclic redundancy check (CRC) data field to include a CRC code generated by the logic. Data packets received from the FOH rack are buffered, decoded and separated into data and control information. The CRC data in a received packet is used to confirm that the data has been reliably received.

As an example implementation, each data packet may be designed to be transmitted in a single frame, within one period of the audio sample clock signal. The data packet includes a top of frame code (provided by one of the special codes of the encoding scheme, e.g. the K28.5 code for 8B10B), followed by several words, such as one to eight words, of control information. The audio data appears next in the packet. For example, 72 channels of 24-bit encoded data (resulting in 30-bits per channel when using 8B10B encoding) may be provided. This encoded data may include audio data for several channels and additional control data. A cyclic redundancy check field follows, and null fields may be used as padding in the data packet to force it to fit a frame. The ordering and positions of the audio channels, and the number and positions of words of control information in a data packet depends on the implementation. It also is possible to provide some control information after the audio data instead of null packets. Each data packet may originate in logic 202 as a sequence of 8-bit words, but is subsequently encoded, if using 8B10B encoding, into a sequence of 10-bit words for transmission. In this implementation, 256 words of data, and thus 2560 bits, are used per packet in transmission. Thus, if packets are transmitted at 48 kHz, then a bit clock of 122.88 MHz is used.

The logic 202 provides 8B10B encoded data to transmit circuitry 206 which sends the encoded data to the FOH rack over the transmission medium 208. The transmit circuitry transforms the 8B10B encoded data into a signal suitable for transmission over the transmission medium 208. The transmit circuitry 206 uses the recovered clock provided by the receive circuitry 210 described below. Pre-emphasis may be used in the transmit circuitry 206 to improve signal quality. If the transmission medium includes redundant media, the signal is sent over the redundant media as well.

Receive circuitry 210 receives data from the FOH rack over the transmission medium 212. It includes a clock recovery circuit to generate a clock signal to extract the data from the received signal. The receive circuitry 210 outputs the extracted 8B10B data to the logic 202 along with the recovered clock signal. The receive circuitry 210 may include adaptive equalization to improve signal quality. The clock recovery circuit preferably uses fast-locking phase-locked loops (PLLs) to improve the speed of changeover from one transmission medium to another when a failure is detected. An example clock recovery circuit that may be used is the Micrel SY87700L. Due to the signals on the transmission medium having the format described above, the data may be readily extracted using known techniques for processing such signals.

If the transmission medium includes redundant cabling, the receive circuitry includes a multiplexer that selects one of the received signals for processing. The receive circuitry also includes a line detection circuit that detects whether a signal is available on each transmission medium. The line detection circuit can be used to drive the selection of the multiplexer and to provide a visual indication of whether a line is active. Other techniques for detecting errors or failures on a transmission medium may be used, and may drive switching of reception of a signal from one transmission medium to the other.

On the FOH rack side 240, logic 242 provides audio sample clocks to the processing engine, whether a set of DSP processors in an embedded computer in the FOH rack or in the console. The logic 242 also connects to an input/output interface 244 through which input audio data and control information and output audio data and control information may be communicated to other devices in or connected to the FOH rack. Such an interface may provide data to and receive data from an interface such as described in U.S. patent application Ser. No. 10/342,963, filed Jan. 15, 2003 and entitled "Audio and Music Data Transmission Medium and Transmission Protocol."

The operation of logic 242 at the FOH rack is generally the same as for the stage rack. In particular it prepares and encodes data packets to be sent to the stage rack and decodes and processes data packets received from the stage rack. However, the FOH rack is configured as a master and the stage rack is configured as a slave for clock signal processing and synchronization, as described in more detail below. Thus, in the FOH rack, transmission is based on a local clock (whether locally generated or synchronized to an external source). The FOH can source and sink audio data with the stage rack. Received data is processed in the FOH rack based on the clock signal recovered by the receive circuitry.

The logic 242 provides 8B10B encoded data packets to transmit circuitry 246 which sends the encoded data to the stage rack over the transmission medium 212. The transmit circuitry transforms the 8B10B encoded data into a signal suitable for transmission over the transmission medium 212. The transmit circuitry 246 uses a clock based on a local oscillator or an external source. The transmit circuitry 246 may use pre-emphasis to improve signal quality. If the transmission medium includes redundant cabling, the signal is sent over the redundant cabling as well.

Receive circuitry 250 receives data from the stage rack over the transmission medium 208. It includes a clock recovery circuit to generate a clock signal to extract data from the received signal. The receive circuitry 250 outputs the extracted 8B10B data to the logic 242 along with the recovered clock signal. The receive circuitry 250 may perform adaptive equalization to improve signal quality. The clock recovery circuit preferably uses fast-locking phase-locked loops (PLLs) to improve the speed of changeover from one transmission medium to another when a failure is detected. An example clock recovery circuit that may be used is the Micrel SY87700L. As on the stage rack side, due to the signals on the transmission medium having the format described above, the data may be readily extracted using known techniques for processing such signals.

If the transmission medium includes redundant cabling, the receive circuitry includes a multiplexer that selects one of the received signals for processing. The receive circuitry also includes a line detection circuit that detects whether a signal is available on each transmission medium. The line detection circuit can be used to drive the selection of the multiplexer and to provide a visual indication of whether a line is active. Other techniques for detecting errors or failures on a transmission medium may be used, and may drive switching of reception of a signal from one transmission medium to the other.

As noted above, the FOH rack acts as a master device and provides clock signals to the stage rack. More particularly, the FOH rack has a local oscillator 256 at the audio sample rate, e.g., 48 kHz, from which the word clock and bit clock signals are generated at 260. These clock signals are used to control the transmission side of the FOH rack. When data is transmitted to the stage rack, each data packet includes a special code that occurs in the data stream at the audio sampling rate. The clock recovery circuit in the receive circuitry of the stage rack recovers a clock signal. The recovered clock is used by the stage rack for both receiving and transmitting data. This recovered clock also may be used by the stage rack to synchronize with yet other devices as a sub-master. When data is transmitted back to the FOH rack, each data packet includes the special code that occurs in the data stream at the audio sampling rate. The clock recovery circuit in the receive circuitry of the FOH rack recovers a clock signal. The recovered clock is used by the FOH rack for receiving data.

The word clock and bit clock generator 260 and the logic 242 also may receive an external audio sample clock signal. This external signal may be used to synchronize the FOH rack with external equipment. The logic 242 may provide a signal to the word clock and bit clock generator 260 to enable it to synchronize either to the local oscillator 256 or to this external source.

The synchronization to the external source may be enabled by logic 242 in a manner such that the external source is used only if that signal is within a specified target range (e.g., 10 to 30 parts per million) of the target audio sampling rate, such as 48 kHz. If this signal is out of range the logic 242 does not enable locking to this signal. If locking is enabled to this signal and this signal drops out of tracking range (e.g. 30 to 50 parts per million), the logic 242 disables locking to this signal. To measure whether the external source is within range, the logic 242 detects an event, i.e., a transition in the external source signal over a period of time. After detecting an event, the logic is in a state in which it is not expecting an event during a subsequent period of time called a window. If an event occurs in this window, then there is something wrong with the signal and the system does not lock to it. If no event occurs in this window, the logic transitions to a state in which it is expecting an event during a subsequent period of time. If an event occurs in this window, a counter is incremented and the logic transitions back to the state in which no event is expected. If no event occurs during the window in which an event is expected, the signal is rejected. After several such transitions, if the counter reaches a threshold level, the signal is deemed to be acceptable.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A stage rack for a live audio presentation system, comprising:

logic for processing input digital audio data and control information and for providing output digital audio data and control information;

a receive interface for receiving a signal from a first transmission medium, wherein the signal includes encoded data packets occurring at an audio sampling rate and including a unique code, and for recovering a bit clock signal using the unique codes in the data packets, and for recovering, and providing to the logic, digital audio data and control information from the data packets; and a transmit interface for sending a signal over a second transmission medium, wherein the signal includes encoded data packets occurring at the audio sampling rate, wherein the encoded data packets are received from the logic and include digital audio data and control information and a unique code from which a bit clock signal can be recovered, wherein bits of the encoded data packets are sent in synchronization with the bit clock signal recovered by the receive interface.

2. The stage rack of claim 1, wherein the logic encodes the digital audio data and control information using a form of encoding that results in a DC-free signal.

3. The stage rack of claim 1, wherein the logic encodes the digital audio data and control information using a form of encoding that provides unique codes.

4. The stage rack of claim 3, wherein the form of encoding is 8B10B encoding.

5. The stage rack of claim 3, wherein the encoded data include Forward Error Correction Coding.

6. The stage rack of claim 5, wherein the Forward Error Correction Coding is Turbo-Code.

7. The stage rack of claim 5, wherein the Forward Error Correction Coding is Reed-Solomon Code.

8. The stage rack of claim 1, wherein the transmission medium is a serial digital interface for video data.

9. The stage rack of claim 1, wherein the encoded data packets include error recovery data.

10. The stage rack of claim 9, wherein the error recovery data includes cyclic redundancy check data.

11. A front of house rack for a live audio presentation system, comprising:
  logic for processing input digital audio data and control information and for providing output digital audio data and control information;
  a receive interface for receiving a signal from a first transmission medium, wherein the signal includes encoded data packets occurring at an audio sampling rate and including a unique code, and for recovering a bit clock signal using the unique codes in the data packets, and for recovering, and providing to the logic, digital audio data and control information from the data packets; and
  a transmit interface for sending a signal over a second transmission medium, wherein the signal includes encoded data packets occurring at the audio sampling rate, wherein the encoded data packets are received from the logic and include digital audio data and control information and a unique code from which a bit clock signal can be recovered, wherein bits of the encoded data packets are sent in synchronization with a bit clock signal generated in response to a reference audio sample clock signal.

12. The front of house rack of claim 11, wherein the logic encodes the digital audio data and control information using a form of encoding that results in a DC-free signal.

13. The front of house rack of claim 11, wherein the logic encodes the digital audio data and control information using a form of encoding that provides unique codes.

14. The front of house rack of claim 13, wherein the form of encoding is 8B10B encoding.

15. The front of house rack of claim 11, wherein the transmission medium is a serial digital interface for video data.

16. The front of house rack of claim 11, wherein the encoded data packets include error recovery data.

17. The front of house rack of claim 16, wherein the error recovery data includes cyclic redundancy check data.

18. The front of house rack of claim 11, wherein the reference audio sample clock signal is generated by a local oscillator.

19. The front of house rack of claim 11, wherein the reference audio sample clock signal is provided by an external reference audio sample clock signal, and wherein the logic determines whether a rate of the external reference audio sample clock signal is within a specified range of an expected audio sample clock rate.

20. The front of house rack of claim 19, wherein the specified range is a target range and the logic also allows tracking over a wider tracking range after locking to that target range.

21. The front of house rack of claim 11, wherein the encoded data include Forward Error Correction Coding.

22. The front of house rack of claim 21, wherein the Forward Error Correction Coding is Turbo-Code.

23. The front of house rack of claim 21, wherein the Forward Error Correction Coding is Reed-Solomon Code.

24. A live audio presentation system, comprising;
  one or more stage racks;
  a front of house rack;
  a first transmission medium connected between the one or more stage racks and the front of house rack to communicate data from the front of house rack to the one or more stage racks;
  a second transmission medium connected between the one or more stage racks and the front of house rack to communicate data from the one or more stage racks to the front of house rack;
  wherein the front of house rack includes first logic for processing input digital audio data and control information and for providing output digital audio data and control information and includes a transmit interface for sending a signal over the first transmission medium, wherein the signal includes encoded data packets occurring at the audio sampling rate, wherein the encoded data packets are received from the first logic and include digital audio data and control information and a unique code from which a bit clock signal can be recovered, wherein bits of the encoded data packets are sent in synchronization with a bit clock signal generated in response to a reference audio sample clock signal;
  wherein at least one of the one or more stage racks includes a receive interface for receiving a signal from the first transmission medium, wherein the signal includes encoded data packets occurring at an audio sampling rate and including a unique code, and for recovering a bit clock signal using the unique codes in the data packets, and for recovering digital audio data and control information from the data packets;
  wherein the at least one of the one or more stage racks includes second logic for processing input digital audio data and control information and for providing output digital audio data and control information, and a transmit interface for sending a signal over the second transmission medium, wherein the signal includes encoded data packets occurring at the audio sampling rate, wherein the encoded data packets are received from the second logic and include digital audio data and control information and a unique code from which a bit clock signal can be recovered, wherein bits of the encoded data packets are sent in synchronization with the bit clock signal recovered by the receive interface of the stage rack; and
  wherein the front of house rack includes a receive interface for receiving a signal from the second transmission medium, wherein the signal includes encoded data packets occurring at an audio sampling rate and including a unique code, and for recovering a bit clock signal using the unique codes in the data packets, and for recovering digital audio data and control information from the data packets.

25. The live audio presentation system of claim 24, further comprising:
  a first redundant transmission medium connected between the one or more stage racks and the front of house rack to communicate data from the one or more stage racks to the front of house rack; and a second redundant transmission medium connected between the one or more stage racks and the front of house rack to communicate data from the front of house rack to the one or more stage racks.

26. The live audio presentation system of claim 25, including logic for detecting an error on the first transmission medium and for automatically switching to receiving from the first redundant transmission medium.

27. The live audio presentation system of claim 25, including logic for detecting an error on the second transmission medium and for automatically switching to receiving from the second redundant transmission medium.

28. A live audio presentation system comprising;
   one or more stage racks;
   a front of house rack;
   a transmission medium connected between the one or more stage racks and the front of house rack to communicate data from the front of house rack to the one or more stage racks;
   wherein the front of house rack includes:
      a computer executing a first process for processing audio information,
      a set of digital signal processors connected to the computer for performing audio processing on audio information according to plug-in code provided by the computer;
   wherein the computer executes a second process which is separate from the first process and which provides an interface for an operator to control parameters of the audio processing performed by the set of digital signal processors;
   wherein the front of house rack further comprises a console having a first connection with the set of digital signal processors for communicating audio information and control information to the set of digital signal processors;
   wherein the computer has a connection for communicating audio information and control information to the set of digital signal processors; and
   wherein the console communicates control information to the set of digital signal processors, and wherein, when the computer is operational, the set of digital signal processors provides the control information to the computer and receives control signals from the computer based on the control information provided to the computer, and wherein the console communicates control information to the set of digital signal processors, and wherein, when the computer is not operational, the set of digital signal processors generates control signals based on the control information provided by the console.

* * * * *